United States Patent
Yang et al.

(10) Patent No.: US 12,423,775 B2
(45) Date of Patent: Sep. 23, 2025

(54) METHOD AND SYSTEM FOR PROCESSING GRAPHICS IN TILE-BASED RENDERING MODE BY EXPANDING BOUNDARIES OF TILES

(71) Applicant: INNOSILICON MICROELECTRONICS (ZHUHAI) CO., LTD., Zhuhai (CN)

(72) Inventors: Xile Yang, Zhuhai (CN); Hai Ao, Zhuhai (CN)

( * ) Notice: Subject to any disclaimer, the term of this patent is extended or adjusted under 35 U.S.C. 154(b) by 349 days.

(21) Appl. No.: 18/191,010

(22) Filed: Mar. 28, 2023

(65) Prior Publication Data

US 2024/0078634 A1  Mar. 7, 2024

Related U.S. Application Data

(63) Continuation of application No. PCT/CN2022/139346, filed on Dec. 15, 2022.

(30) Foreign Application Priority Data

Sep. 1, 2022  (CN) .................... 202211059661.2

(51) Int. Cl.
| | | |
|---|---|---|
| *G06T 5/20* | (2006.01) | |
| *G06T 7/11* | (2017.01) | |
| *G06T 7/60* | (2017.01) | |

(52) U.S. Cl.
CPC .................. *G06T 5/20* (2013.01); *G06T 7/11* (2017.01); *G06T 7/60* (2013.01)

(58) Field of Classification Search
CPC ................ G06T 5/20; G06T 7/11; G06T 7/60
See application file for complete search history.

(56) References Cited

U.S. PATENT DOCUMENTS

| | | | |
|---|---|---|---|
| 8,803,872 B2 * | 8/2014 | Akenine-Moller | G06T 15/205 345/419 |
| 9,224,227 B2 * | 12/2015 | Meixner | G06T 15/005 |
| 10,078,881 B2 * | 9/2018 | Lee | G06T 15/005 |
| 10,152,819 B2 * | 12/2018 | Grossman | G06T 11/40 |
| 10,255,653 B2 * | 4/2019 | Sansottera | G06T 17/20 |
| 10,755,383 B2 * | 8/2020 | Hensley | G06T 15/005 |
| 11,120,591 B2 * | 9/2021 | Valient | G06T 3/047 |

(Continued)

FOREIGN PATENT DOCUMENTS

WO    2022058012 A1    3/2022

*Primary Examiner* — Gregory M Desire

(57) ABSTRACT

The present disclosure discloses a method and system for processing graphics in tile-based rendering mode by expanding boundaries of tiles. The system includes: a geometry processing system configured to perform geometry processing on primitives to tile visible primitives into a plurality of expanded tiles M' in screen view space; and a fragment processing system configured to render each expanded tile M' to obtain rendered images of the plurality of expanded tiles M', and enable a filter kernel to perform pixel filtering according to the rendered image of each expanded tile M', where the plurality of expanded tiles M' are obtained by dividing the screen view space into a plurality of tiles M and expanding boundaries of the plurality of tiles M respectively. In the present disclosure, the pixel filtering process can be done after rendering of each tile, thereby effectively improving the processing efficiency of pixel filtering.

18 Claims, 3 Drawing Sheets

(56) References Cited

U.S. PATENT DOCUMENTS 11,790,480 B2 * 10/2023 Yang .................... G06T 15/005
                                                      345/520
11,861,760 B2 * 1/2024 Brkic ........................ G06T 1/60
12,205,248 B2 * 1/2025 King .................... G06T 11/001

* cited by examiner

METHOD AND SYSTEM FOR PROCESSING GRAPHICS IN TILE-BASED RENDERING MODE BY EXPANDING BOUNDARIES OF TILES

RELATED APPLICATIONS

This application is a bypass continuation of International Application No. PCT/CN2022/139346, filed on Dec. 15, 2022, which claims priority to Chinese Patent Application No. 202211059661.2 filed on Sep. 1, 2022. The disclosures of the prior applications are hereby incorporated by reference in their entirety.

TECHNICAL FIELD

The present disclosure relates to the technical field of image processing, and more particularly, to a method and system for processing graphics in tile-based rendering mode by expanding boundaries of tiles.

BACKGROUND

Computer graphics processing systems are designed to process graphics data (including primitive data and vertex data) from computer graphics applications, such as computer games, and output rendered images generated through a rendering pipeline.

A three-dimensional (3D) model in a graphics application is set up by splitting objects in a scene using primitives (including, but not limited to, triangles, lines, and points, for example) which are defined by vertices for their positions in the 3D space, as well as lighting effects and shading properties. Geometry data of primitives and vertices of the 3D model are sent as an input data stream for the geometry processing phase of the rendering process to a computer graphics processing system, and then the input primitives are subjected to geometry processing, which includes transforming the primitives into screen space and removing primitives that are not visible in the screen space. After the geometry processing, the geometry data of primitives and vertices are sent to a fragment processing pipeline to be rendered in the computer graphics processing system. As a result of the rendering processing, an output image from the 3D model is generated by the computer graphics processing system and displayed on a display unit (e.g., a display screen).

The existing computer graphics processing systems include a tile-based rendering mode. In the tile-based rendering mode, the screen is divided into rectangular tiles, and primitives, after being subjected to geometry processing, are sorted into different tiles on the screen, and then fragment processing is performed in each tile on the screen separately to generate rendered images. As the rendered image in the tile-based rendering mode computer graphics processing system is generated separately in each tile and filtering of pixels on the boundaries of each tile will involve pixels in adjacent tiles, filtering of pixels on the boundaries of the tiles cannot be done during processing of the tile. As a result, pixel processing using information from surrounding pixels has to be performed separately after the entire rendering process is completed. In other words, pixel filtering has to be done in two phases. Therefore, the processing performance needs to be improved.

SUMMARY

In view of the above defects or need for improvement of the prior art, the present disclosure provides a method and system for processing graphics in tile-based rendering mode by expanding boundaries of tiles, allowing for a pixel filtering process to be done after rendering of each tile, thereby effectively improving the processing efficiency of pixel filtering.

In order to achieve the above objective, according to one aspect of the present disclosure, there is provided a graphics processing system, including: a geometry processing system configured to perform geometry processing on primitives to tile visible primitives into a plurality of expanded tiles M' in screen view space; and a fragment processing system configured to render each expanded tile M' to obtain rendered images of the plurality of expanded tiles M', and enable a filter kernel to perform pixel filtering according to the rendered image of each expanded tile M', where the plurality of expanded tiles M' are obtained by dividing the screen view space into a plurality of tiles M and expanding boundaries of the plurality of tiles M respectively.

In some embodiments, each tile M is a rectangular tile of N×N pixels, while each expanded tile M' is a rectangular tile of (N+2k)×(N+2k) pixels, which is obtained by expanding each boundary of the respective tile M outward by k pixel(s); and the filter kernel is a (2k+1)×(2k+1) filter kernel.

In some embodiments, the geometry processing system includes a geometry processing pipeline and a tiling module, the geometry processing pipeline being configured to delete primitives invisible in the screen view space with only primitives visible in the screen view space retained, and the tiling module being configured to tile the visible primitives into the plurality of expanded tiles M' in the screen view space and generate a tiling display list for each expanded tile M'; and the fragment processing system is configured to render each expanded tile M' according to the respective tiling display list generated by the tiling module, to obtain the rendered images of the plurality of expanded tiles M'.

In some embodiments, the tiling module tiles the visible primitives into the plurality of expanded tiles M' in the screen view space by checking whether the primitives overlap each expanded tile M'.

In some embodiments, for each expanded tile M', the tiling module is configured to tile all primitives overlapping the expanded tile M' into the expanded tile M' and incorporate the primitives into the tiling display list of the expanded tile M'; and for each primitive, the tiling module is configured to tile the primitive into all expanded tile(s) M' overlapping the primitive and incorporate the primitive into the tiling display list(s) of the expanded tile(s) M'.

In some embodiments, the geometry processing system further includes an input assembler module configured to construct primitives according to input geometry data, and the geometry processing pipeline is configured to process the primitives constructed by the input assembler module to delete the primitives invisible in the screen view space.

In some embodiments, the geometry processing pipeline further includes a geometry transformation module, a clipping and culling module and a data receiving module, where the geometry transformation module is configured to transform vertex data of the primitives into the screen view space; the clipping and culling module is configured to delete the primitives invisible in the screen view space, with only the primitives visible in the screen view space retained; and the data receiving module is configured to receive and store both primitive data and the transformed vertex data of the primitives visible in the screen view space.

In some embodiments, the fragment processing system includes a tile processing module, a rasterization module, a hidden surface removal module, and a pixel shading module, where the tile processing module is configured to acquire the tiling display list generated by the tiling module, and send primitives, in the tiling display list, required for tile rendering to the rasterization module; the rasterization module is configured to acquire primitive data and the transformed vertex data of the primitives referenced in the tiling display list, and rasterize the primitives into visible pixels; the hidden surface removal module is configured to perform a depth test on the visible pixels output by the rasterization module, and remove pixels located behind other primitives at the same pixel positions; and the pixel shading module is configured to shade visible pixels output by the hidden surface removal module.

In some embodiments, the fragment processing system includes a post-processing module configured to enable the filter kernel to perform pixel filtering processing on a rendered image of the tile M in each expanded tile M' according to the rendered image of the expanded tile M', so as to obtain a filtered image of the tile M in each expanded tile M'.

In some embodiments, a filtered color at pixel (x, y) in the tile M after filtering by the (2k+1)×(2k+1) filter kernel is $G(x, y)=\Sigma_{u=-k}^{k}\Sigma_{v=-k}^{k}h(u, v)f(x+u, y+v)$, where $f(x+u, y+v)$ denotes an original pixel color at pixel (x+u, y+v) in the (2k+1)×(2k+1) filter kernel, and $h(u, v)$ denotes a weight factor of $F(x+u, y+v)$.

In some embodiments, when a pixel filtering function of the post-processing module is disabled, the plurality of tiles are a plurality of tiles M, which are obtained by dividing the screen view space.

According to another aspect of the present disclosure, there is provided a graphics processing system, including: a geometry processing system configured to perform geometry processing on primitives to tile visible primitives into a plurality of expanded tiles M' in screen view space; and a fragment processing system configured to render each expanded tile M' to obtain rendered images of the plurality of expanded tiles M', where the plurality of expanded tiles M' are obtained by dividing the screen view space into a plurality of tiles M and expanding boundaries of the plurality of tiles M respectively; where the fragment processing system is further configured to enable a filter kernel to perform pixel filtering on each tile M after the rendered image of the expanded tile M' in which the tile M is located is obtained.

In some embodiments, the filter kernel is enabled to perform pixel filtering on each tile M according to the rendered image of the expanded tile M' in which the tile M is located, and the pixel filtering process of each tile M is independent of the rendered images of other expanded tiles M' except the expanded tile M' in which the tile M is located.

According to another aspect of the present disclosure, there is provided a graphics processing method, including: performing geometry processing on primitives to tile visible primitives into a plurality of expanded tiles M' in screen view space; rendering each expanded tile M' to obtain rendered images of the plurality of expanded tiles M', where the plurality of expanded tiles M' are obtained by dividing the screen view space into a plurality of tiles M and expanding boundaries of the plurality of tiles M respectively; and enabling a filter kernel to perform pixel filtering according to the rendered image of each expanded tile M'.

In some embodiments, each tile M is a rectangular tile of N×N pixels, while each expanded tile M' is a rectangular tile of (N+2k)×(N+2k) pixels, which is obtained by expanding each boundary of the respective tile M outward by k pixel(s); and the filter kernel is a (2k+1)×(2k+1) filter kernel.

In some embodiments, the performing geometry processing on primitives comprises: deleting primitives invisible in the screen view space, with only primitives visible in the screen view space retained; tiling the visible primitives into the plurality of expanded tiles M' in the screen view space and generating a tiling display list for each expanded tile M'; and rendering each expanded tile M' according to the tiling display list.

In some embodiments, the graphics processing method further includes: tiling the visible primitives into the plurality of expanded tiles M' in the screen view space by checking whether the primitives overlap each expanded tile M'.

In some embodiments, for each expanded tile M', all primitives overlapping the expanded tile M' are tiled into the expanded tile M' and incorporated into the tiling display list of the expanded tile M'; and for each primitive, the primitive is tiled into all expanded tile(s) M' overlapping the primitive and incorporated into the tiling display list(s) of the expanded tile(s) M'.

In some embodiments, the graphics processing method further includes: constructing primitives according to input geometry data; and the performing geometry processing on primitives further includes: transforming vertex data of the primitives into the screen view space.

In some embodiments, the rendering each expanded tile M' according to the tiling display list comprises: acquiring primitive data and the transformed vertex data of the primitives referenced in the tiling display list, and rasterizing the primitives into visible pixels; performing a depth test on the visible pixels, and removing pixels located behind other primitives at the same pixel positions; and shading remaining visible pixels after the pixel removal.

In some embodiments, the enabling a filter kernel to perform pixel filtering according to the rendered image of each expanded tile M' includes: enabling the filter kernel to perform the pixel filtering processing on a rendered image of the tile M in each expanded tile M' according to the rendered image of the expanded tile M', so as to obtain a filtered image.

In some embodiments, all pixels needed for filtering processing on the rendered image of each tile M are contained in the expanded tile M' in which the tile M is located.

In some embodiments, a filtered color at pixel (x, y) in the tile M after filtering by the (2k+1)×(2k+1) filter kernel is $G(x, y)=\Sigma_{u=-k}^{k}\Sigma_{v=-k}^{k}h(u, v)f(x+u, y+v)$, where $f(x+u, y+v)$ denotes an original pixel color at pixel (x+u, y+v) in the (2k+1)×(2k+1) filter kernel, and $h(u, v)$ denotes a weight factor of $F(x+u, y+v)$.

According to another aspect of the present disclosure, there is provided a graphics processing method, including: performing geometry processing on primitives to tile visible primitives into a plurality of expanded tiles M' in screen view space; rendering each expanded tile M' to obtain rendered images of the plurality of expanded tiles M', where the plurality of expanded tiles M' are obtained by dividing the screen view space into a plurality of tiles M and expanding boundaries of the plurality of tiles M respectively; and enabling a filter kernel to perform pixel filtering on each tile M after the rendered image of the expanded tile M' in which the tile M is located is obtained.

In some embodiments, the filter kernel is enabled to perform pixel filtering on each tile M according to the rendered image of the expanded tile M' in which the tile M is located, and the pixel filtering process of each tile M is independent of the rendered images of other expanded tiles M' except the expanded tile M' in which the tile M is located.

According to another aspect of the present disclosure, there is provided an electronic device, including the graphics processing system described above.

According to another aspect of the present disclosure, there is provided an electronic device, including: a processor, and a memory communicatively connected to the processor; where the memory stores instructions executable by the processor and the processor implements the graphics processing method described above by executing the instructions.

According to another aspect of the present disclosure, there is provided a computer-readable storage medium storing computer instructions, where the computer instructions implement the graphics processing method when executed by a processor.

Overall, compared with the prior art, the above technical solution conceived in the present disclosure may have following beneficial effects: when the filter kernel is applied to the rendered tiles for pixel processing, each boundary of the rendered tiles is expanded outward by pixel(s) such that all pixels required for pixel processing are contained in the expanded tiles, and thus the pixel filtering process can be done after rendering of each tile, rather than implemented with another separate phase of processing after all tiles are rendered, which effectively improves the processing efficiency of pixel filtering.

DETAILED DESCRIPTION

In order to make the objectives, technical solutions and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure. As will be appreciated by those skilled in the art, the embodiments described herein may be modified in various manners without departing from the principle or scope of the present disclosure. Therefore, the accompanying drawings and descriptions are regarded as illustrative in nature rather than restrictive.

In computer graphics, image processing techniques could be applied to rendered images, for example, bloom, depth of field and super resolution upscaling, for the enhancement of a visual effect of the rendering. Pixel colors from surrounding areas of sampled pixels are usually involved in the algorithms for this kind of image processing.

For example, filtered color G(x, y) at pixel (x, y) after filtering by a (2k+1)×(2k+1) filter kernel may be:

$$G(x, y) = \sum_{u=-k}^{k} \sum_{v=-k}^{k} h(u, v) f(x+u, y+v)$$

where f(x+u, y+v) denotes an original pixel color at pixel (x+u, y+v) in the (2k+1)×(2k+1) filter kernel, and h(u, v) denotes a weight factor of F(x+u, y+v).

Figure 1:
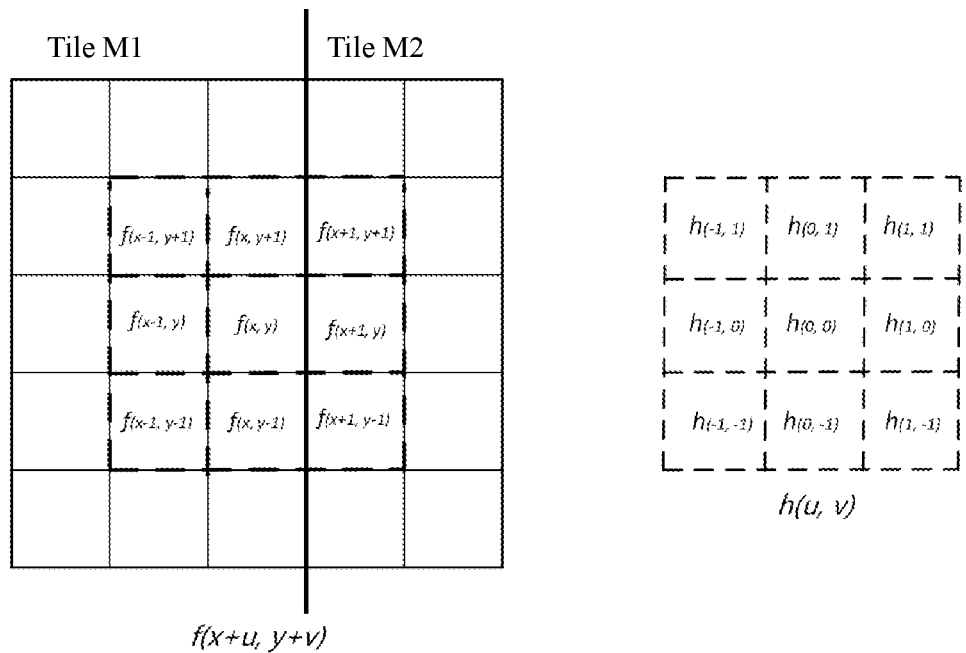
FIG. 1 is a schematic diagram of pixel filtering with a 3×3 pixel filter kernel.

FIG. 1 is a schematic diagram of pixel filtering with a 3×3 pixel filter kernel when k=1. Filtered color at pixel (x, y) after filtering by the 3×3 filter kernel may be G(x, y)= $\sum_{u=-1}^{1}\sum_{v=-1}^{1}h(u, v)f(x+u, y+v)$. It can be seen that filtering of pixel (x, y) requires information of 8 pixels around it. In other words, when k=1, the filter kernel needs to further process (3×3−1) pixels around the pixel. Similarly, when k=2, the filter kernel needs to further process (5×5−1) pixels around the pixel.

As the rendered image in the tile-based rendering mode computer graphics processing system is generated separately in each tile and filtering of pixels on the boundaries of each tile will involve pixels in adjacent tiles, filtering of pixels on the boundaries of the tiles cannot be done during processing of the tile. As shown in FIG. 1, the calculation of filtering on original pixel color f(x, y) in tile M1 requires information of original pixel colors f(x+1, y+1), f(x+1, y) and f(x+1, y−1) in adjacent tiles M2. As a result, the filtering of the boundary pixel (x, y) of tile M1 cannot be completed during processing of tile M1.

In view of this, in embodiments of the present disclosure, when the filter kernel is applied to the rendered tiles for pixel processing, each boundary of the rendered tiles is expanded outward by pixels to enable all pixels required for pixel processing to be contained in the expanded tiles, so that the pixel filtering process can be completed after rendering of each tile, rather than implemented with another separate phase of processing after all tiles are rendered, thus effectively improving the processing efficiency of pixel filtering.

In some embodiments, when the (2k+1)×(2k+1) filter kernel is applied to the rendered image for pixel processing, the tile of N×N pixels is expanded outward by k pixels on each boundary.

Figure 2:
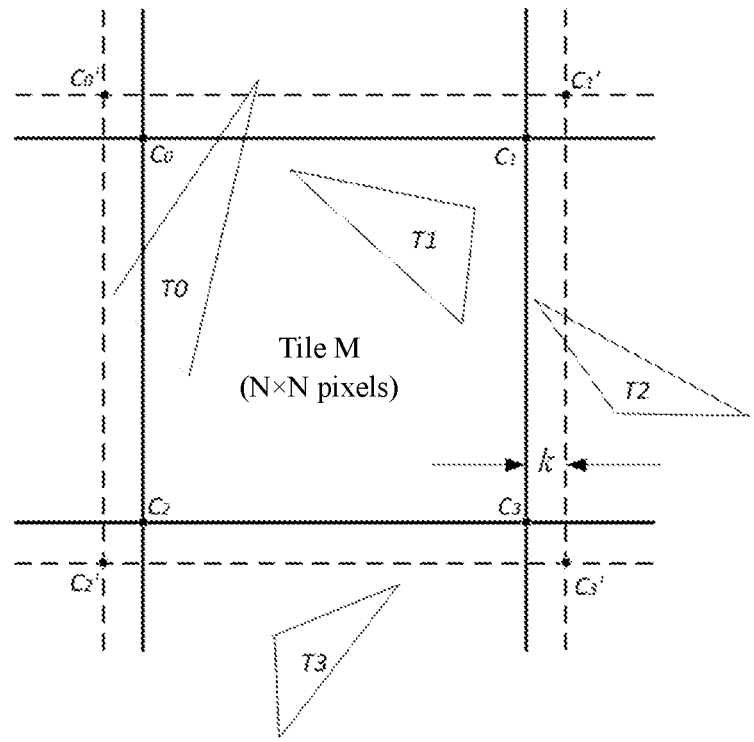
FIG. 2 is a schematic diagram of tile boundary expansion according to an embodiment of the present disclosure.

As shown in FIG. 2, tile M of N×N pixel size (i.e. a rectangular area defined by corner points $C_0$, $C_1$, $C_2$, and $C_3$) is expanded outward by k pixels on each boundary. In other words, the original tile M of N×N pixel size is expanded to an expanded tile M' with (N+2k)×(N+2k) pixels (i.e. a rectangular area defined by corner points $C_0'$, $C_1'$, $C_2'$, and $C_3'$).

In some embodiments, after the rendering in the expanded tile M' is completed, the (2k+1)×(2k+1) filter kernel is enabled to be applied to the output rendered image for pixel processing.

In an embodiment of the present disclosure, all the pixels needed for the pixel processing with the (2k+1)×(2k+1) filter kernel on pixels in the N×N tile are contained in the expanded tile (N+2k)×(N+2k). Therefore, the pixel filtering process can be done immediately after rendering of each tile, rather than implemented with another separate phase of processing after all tiles are rendered, thus effectively improving the processing efficiency of pixel filtering.

Figure 3:
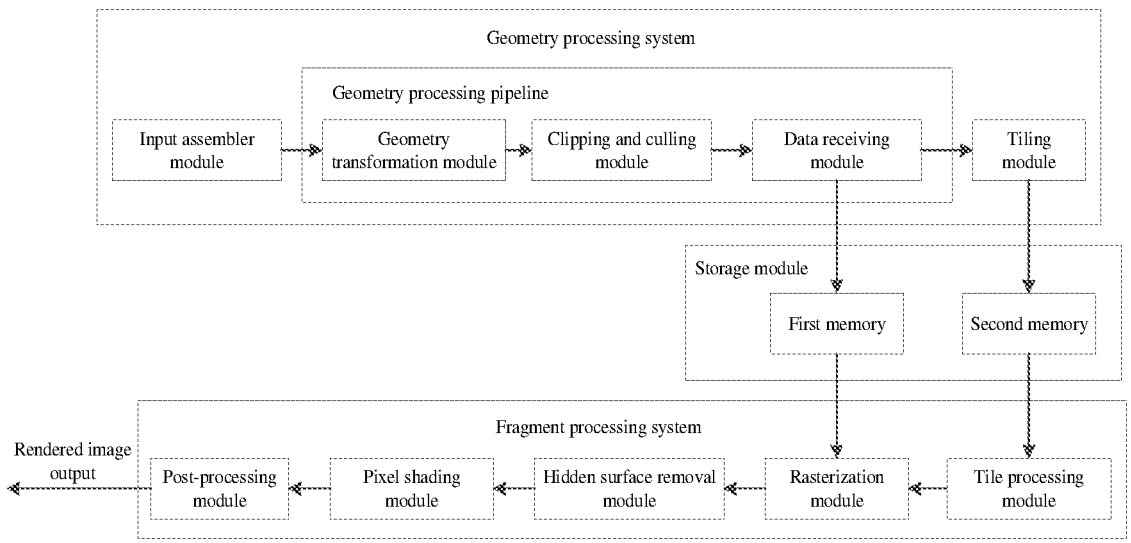
FIG. 3 is a schematic diagram of a graphics processing system in tile-based rendering mode according to an embodiment of the present disclosure.

As shown in FIG. 3, the system for processing graphics in tile-based rendering mode by expanding boundaries of tiles in an embodiment of the present disclosure includes a geometry processing system and a fragment processing system. The geometry processing system is configured to construct primitives according to input geometry data (such as vertex data), and perform geometry processing on the primitives to tile visible primitives into a plurality of tiles in screen view space, and generate a tiling display list for each tile.

The geometry processing system further includes an input assembler module, a geometry processing pipeline, and a tiling module. The input assembler module is configured to construct primitives according to input geometry data. The geometry processing pipeline is configured to process the constructed primitives to delete primitives invisible in the screen view space, with only primitives visible in the screen view space retained. The tiling module is configured to tile the visible primitives into a plurality of tiles in the screen view space and generate a tiling display list for each tile.

In some embodiments, the tiling display list contains all the primitives that at least partially overlap the tile and hence need to be rendered in the tile. When a primitive is located in a plurality of tiles, the primitive is included in tiling display lists of all the tiles, in the screen view space, in which the primitive is located.

In some embodiments, the screen view space is divided into a plurality of tiles M, the visible primitives are tiled into the plurality of tiles M, and a tiling display list is generated for each tile M. As shown in FIG. 2, for the tile M of N×N pixel size in the screen view space, by checking whether the primitives are completely or partially located in the rectangular area defined by corner points $C_0$, $C_1$, $C_2$, and $C_3$, tiling of the primitives can be completed. For example, primitive T0 partially overlaps the rectangular area, and primitive T1 is located within the rectangular area, so that both primitive T0 and primitive T1 are included in the tiling display list of the tile M. Neither of primitive T2 and primitive T3 overlaps the rectangular area, and therefore, neither of primitive T2 and primitive T3 is included in the tiling display list of the tile M.

In some embodiments, the screen view space is divided into a plurality of tiles M (i.e. original tiles), which are expanded on the boundaries to obtain expanded tiles M'. The visible primitives are tiled into the plurality of tiles M' in the screen view space, and a tiling display list is generated for each tile M'. As shown in FIG. 2, the original tile M of (N+2k)×(N+2k) pixel size is expanded into the expanded tile M' having (N+2k)×(N+2k) pixels, and the primitives can be tiled by checking whether the primitives are completely or partially located in the rectangular area defined by corner points $C_0$, $C_1$, $C_2$, and $C_3$. For example, primitive T0 and primitive T2 partially overlap the rectangular area, and primitive T1 is located within the rectangular area, so that primitive T0, primitive T1, and primitive T2 are all included in the tiling display list of the tile M'. Primitive T3 does not overlap the rectangular area, and therefore, primitive T3 is not included in the tiling display list of the tile M'.

The geometry processing pipeline further includes a geometry transformation module, a clipping and culling module, and a data receiving module. The geometry transformation module is configured to transform the vertex data of the primitives constructed by the input assembler module into the screen view space. The clipping and culling module is configured to delete the primitives invisible in the screen view space, with only the primitives visible in the screen view space retained, which are primitives needed for scene rendering. The data receiving module is configured to receive and store both primitive data of the primitive visible in the screen view space and the transformed vertex data of the primitive visible in the screen view space.

In some embodiments, the geometry processing system includes one geometry processing pipeline, which processes the primitives constructed by and sent from the input assembler module. In some embodiments, the geometry processing system includes a plurality of geometry processing pipelines, and the primitives constructed by the input assembler module are distributed downstream to the plurality of geometry processing pipelines for separate processing.

The primitive data and the transformed vertex data in the data receiving module are written into a first memory in a memory module, and the tiling display list generated by the tiling module is written into a second memory in the memory module.

The fragment processing system is configured to render the tiles according to the tiling display lists generated by the geometry processing system, to obtain rendered images. As shown in FIG. 3, the fragment processing system includes a tile processing module, a rasterization module, a hidden surface removal module, a pixel shading module, and a post-processing module. The tile processing module is configured to read the tiling display lists generated by the geometry processing system from the second memory, and send the primitives needed for tile rendering in the tiling display lists to the rasterization module.

The rasterization module is configured to read, from the first memory, primitive data and transformed vertex data of the primitives referenced in the tiling display lists, and rasterize the primitives into visible pixels. In some embodiments, for the original tile M, the primitives are rasterized into visible pixels in the tile M. In some embodiments, for the expanded tile M', the primitives are rasterized into visible pixels in the tile M'.

The hidden surface removal module is configured to perform a depth test on the visible pixels output by the rasterization module. Specifically, depth values of the visible pixels output by the rasterization module are compared with depth values of previous primitive pixels stored in a depth buffer. When a primitive pixel output by the rasterization module is hidden behind a corresponding previous primitive pixel, the primitive pixel output by the rasterization module fails the depth test and is removed. Otherwise, a primitive pixel output by the rasterization module is sent to the pixel shading module. In other words, pixels located behind other primitives at the same pixel positions are removed by the hidden surface removal module. In some embodiments, the depth values of the previous primitive pixels are predefined values. In some embodiments, the depth values of the previous primitive pixels are the depth values of the primitive pixels that passed the depth test before.

To avoid frequent data exchange with an external memory, current depth value of each pixel is stored in an on-chip depth buffer in the tile-based rendering mode computer graphics processing system. In some embodiments, for the original tile M, current depth value of each pixel in the tile M with N×N pixels is stored in the on-chip depth buffer, that is, the on-chip depth buffer for storing the current depth values has a N×N pixel size. In some embodiments, for the expanded tile M', current depth value of each pixel in the tile M' with (N+2k)×(N+2k) pixels is stored in the on-chip depth buffer, that is, the on-chip depth buffer for storing the current depth values has a (N+2k)×(N+2k) pixel size.

The pixel shading module is configured to shade the visible pixels output by the hidden surface removal module so as to obtain the final color of the primitive pixels. In some embodiments, color information of pixels in the tile is stored in an on-chip color buffer in the tile-based rendering mode computer graphics processing system, to avoid frequent data exchange with the external memory and avoid impact on processing efficiency.

In some embodiments, the pixel shading module shades the pixels in the original tile M.

In some embodiments, the pixel shading module shades the pixels in the expanded tile M', in which case additional pixel shading work is done on extra pixels in the expanded tile M'.

When the filter kernel is applied to the rendered output image for pixel processing, since pixel colors in the expanded tile M' are generated as along with pixel colors in the original tile M, pixel processing that uses information from surrounding pixel colors can be done directly after the pixel colors are generated in the original tile M. In other words, there is no need to wait for generation of pixel colors in all tiles before processing boundary pixels in another separate phase. Therefore, the originally two-phase processing can be completed in one phase, which effectively improves efficiency of pixel processing.

Taking pixel filtering of the 3×3 filter kernel shown in FIG. 1 as an example, pixel filtering for the pixel (x, y) at the boundary of the tile M1 requires original color information of pixels (x+1, y+1), (x+1, y) and (x+1, y−1) from the adjacent tile M2. If the previous rendering process is limited to the original tile, a separate phase of filtering is needed to filter pixels near tile boundaries (such as pixels (x, y), (x, y−1)) after all the tiles are rendered. However, if the previous rendering process is aimed at the expanded tile, the pixels in the expanded boundaries around the original tile (such as pixels (x+1, y+1), (x+1, y) and (x+1, y−1)) can be processed as along with pixels in the original tile. In other words, the filtering operation on the pixels near the original tile boundaries can be done directly after the pixel colors are generated in the expanded tile. Since the extra information of expanded boundary pixels has been acquired, there is no need for a separate processing phase during pixel processing using the filter kernel.

In the scheme of tile-based rendering mode computer graphics processing system proposed in an embodiment of the present disclosure, the use of information of expanded boundary pixels around the original tile helps improve efficiency of pixel processing. At the same time, pixel processing workload is also increased accordingly with the expanded tile boundaries.

Taking the tile shown in FIG. 2 as an example, the tile with boundaries expanded has its tile size increased from N×N to (N+2k)×(N+2k) pixels. The number of extra pixels in the expanded tile boundary area (i.e. the expanded tile M') is:

$$uPexp=2k\times(N+2k)+2k\times N$$

For the 3×3 kernel when k=1, the number of extra pixels in the expanded tile boundary area for a tile with 32×32 pixels is:

$$uPexp=2\times(32+2)+2\times32=132$$

which is 12.89% of the total pixels in a tile of 32×32 pixels.

For the 5×5 kernel when k=2, the number of extra pixels in the expanded tile boundary area for a tile with 32×32 pixels is:

$$uPexp=4\times(32+4)+4\times32=272$$

which is 26.56% of the total pixels in a tile of 32×32 pixels.

It can be seen that the percentage of extra pixels in the expanded tile becomes significant for filter kernel with a bigger size. Therefore, in an embodiment of the present disclosure, a balance can be struck between efficient pixel filtering processing and the workload of shading of extra pixels in the rendering. In other words, k is set to an appropriate value according to actual needs, taking into account both processing efficiency of pixel filtering and the workload of shading of extra pixels in the rendering, which is not limited in the present disclosure.

The post-processing module is configured to enable the filter kernel to perform pixel filtering on the rendered images of the original tiles M to obtain a filtered image. In some embodiments, a filtered color at pixel (x, y) in the original tile M after filtering by the (2k+1)×(2k+1) filter kernel is: $G(x, y)=\Sigma_{u=-k}^{k}\Sigma_{v=-k}^{k}h(u, v)f(x+u, y+v)$, where k is a positive integer, x and y respectively denote the abscissa and ordinate of the pixel in a pixel coordinate system, u and v respectively denote offsets relative to the abscissa x and ordinate y in the image coordinate system, u and v are both integers, f(x+u, y+v) denotes an original pixel color at pixel (x+u, y+v) in the (2k+1)×(2k+1) filter kernel, and h(u, v) denotes a weight factor of F(x+u, y+v).

To avoid additional pixel shading workload, in an embodiment of the present disclosure, expanded tile boundaries could be enabled only for selected renders, and for other unselected renders, a default tile processing method is used. In other words, when extra pixel filtering processing is not needed, a pixel filtering function of the post-processing module is disabled, and the pixel shading and previous process can be performed only on the original tile without extra pixel shading workload; and when extra pixel filtering is needed, the pixel filtering function of the post-processing module is enabled, and the pixel shading and previous process are performed on the expanded tile, which can significantly improve processing efficiency of pixel filtering.

Configuration settings could be used in the tile-based rendering mode computer graphics processing system in this embodiment of the present disclosure to determine whether the pixel post-processing which uses information from surrounding pixels is applied to rendering. In other words, the expanded tile boundaries may be applied to the rendering according to the configuration settings in the embodiment of the present disclosure.

Figure 4:
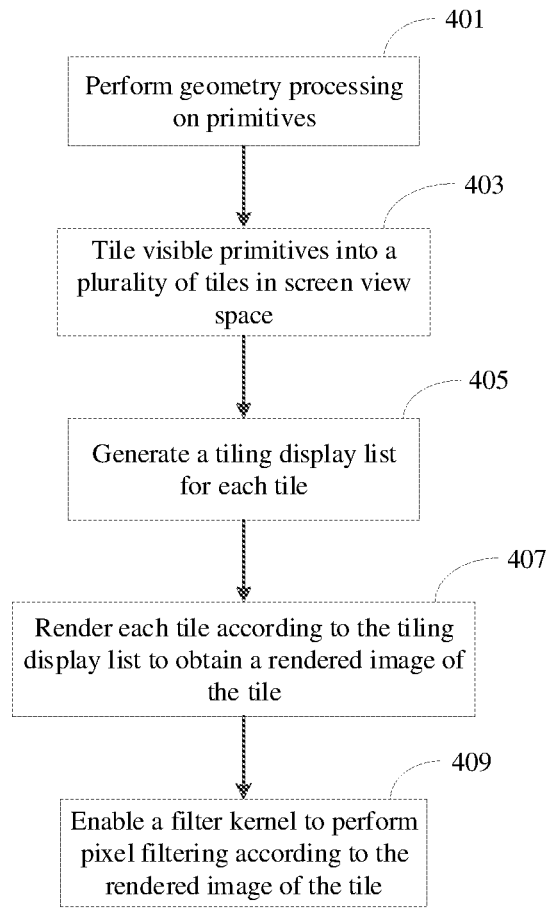
FIG. 4 is a flowchart of a graphics processing method in tile-based rendering mode according to an embodiment of the present disclosure.

As shown in FIG. 4, the method for processing graphics in tile-based rendering mode by expanding boundaries of tiles in an embodiment of the present disclosure includes the following steps.

At step 401, geometry processing is performed on primitives.

In some embodiments, performing geometry processing on primitives includes: deleting primitives invisible in screen view space, with only primitives visible in the screen view space retained.

In some embodiments, performing geometry processing on primitives further includes: transforming vertex data of the primitives into the screen view space.

At step 403, the visible primitives are tiled into a plurality of tiles in the screen view space.

In some embodiments, a tile size is determined through configuration setting.

In some embodiments, when a configuration is set to a first mode (in which pixel filtering is disabled), the plurality of tiles are a plurality of tiles M; and when a configuration is set to a second mode (in which pixel filtering is enabled), the plurality of tiles are a plurality of expanded tiles M'. Here, the plurality of tiles M are obtained by dividing the screen view space, and the plurality of expanded tiles M' are obtained by expanding boundaries of the plurality of tiles M.

In some embodiments, the visible primitives are tiled into a plurality of tiles in the screen view space by checking whether the primitives overlap the tiles.

At step 405, a tiling display list is generated for each tile.

In some embodiments, for each tile, all primitives overlapping the tile are tiled into the tile and incorporated into a tiling display list of the tile; for each primitive, the primitive is tiled into all tiles overlapping the primitive and incorporated into tiling display lists of the tiles. Therefore, when a primitive is located in a plurality of tiles, the primitive will be included in tiling display lists of the plurality of tiles.

At step 407, each tile is rendered according to the tiling display list to obtain a rendered image of the tile.

In some embodiments, rendering each tile according to the tiling display list includes: acquiring primitive data and transformed vertex data of the primitives referenced in the tiling display list, and rasterizing the primitives into visible pixels; performing a depth test on the visible pixels, and removing pixels located behind other primitives at the same pixel positions; and shading the visible pixels that remain after the pixel removal.

In some embodiments, removing pixels located behind other primitives at the same pixel positions includes: comparing depth values of rasterized primitive pixels with depth values of previous primitive pixels stored in a depth buffer, and considering the depth test fails and removing a rasterized primitive pixel when the rasterized primitive pixel is hidden behind a corresponding previous primitive pixel.

In some embodiments, the depth values of the previous primitive pixels are predefined values. In some embodiments, the depth values of the previous primitive pixels are the depth values of the primitive pixels that passed the depth test before.

At step 409, a filter kernel is enabled to perform pixel filtering according to the rendered image of the tile.

In some embodiments, step 409 is performed when the configuration is set to the second mode.

In some embodiments, enabling a filter kernel to perform pixel filtering according to the rendered image of the tile includes: enabling the filter kernel to perform pixel filtering processing on a rendered image of the tile M according to a rendered image of the expanded tile M', so as to obtain a filtered image.

In some embodiments, all pixels needed for filtering processing on the rendered image of the tile M are contained in the expanded tile M'.

In some embodiments, each tile M is a rectangular tile of N×N pixels, while each expanded tile M' is a rectangular tile of (N+2k)×(N+2k) pixels, which is obtained by expanding each boundary of the respective tile M outward by k pixel(s); and the filter kernel is a (2k+1)×(2k+1) filter kernel.

In some embodiments, all the pixels needed for pixel processing with the (2k+1)×(2k+1) filter kernel on pixels in the N×N tile are contained in the expanded tile (N+2k)×(N+2k).

In some embodiments, a filtered color at pixel (x, y) in the tile M after filtering by the (2k+1)×(2k+1) filter kernel is: $G(x, y) = \sum_{u=-k}^{k} \sum_{v=-k}^{k} h(u, v) f(x+u, y+v)$, where k is a positive integer, x and y respectively denote the abscissa and ordinate of the pixel in a pixel coordinate system, u and v respectively denote offsets relative to the abscissa x and ordinate y in the image coordinate system, u and v are both integers, f(x+u, y+v) denotes an original pixel color at pixel (x+u, y+v) in the (2k+1)×(2k+1) filter kernel, and h(u, v) denotes a weight factor of F(x+u, y+v).

In some embodiments, k is set to an appropriate value taking into account both processing efficiency of pixel filtering and the workload of shading of extra pixels in rendering.

In some embodiments, before step 401, the graphics processing method further includes: constructing primitives according to input geometry data.

For further implementation of the method for processing graphics in tile-based rendering mode by expanding boundaries of tiles of embodiments of the present disclosure, reference may be made to the descriptions of the system for processing graphics in tile-based rendering mode by expanding boundaries of tiles in the foregoing embodiments, which have the same beneficial effects as the method in this embodiment. Repeated details are not to be described in the present disclosure.

Figure 5:
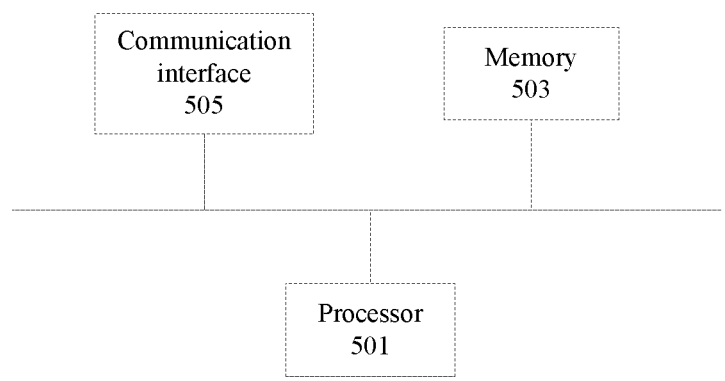
FIG. 5 is a block diagram of an electronic device according to an embodiment of the present disclosure.

FIG. 5 is a block diagram of an electronic device according to an embodiment of the present disclosure. A further embodiment of the present disclosure provides an electronic device, as shown in FIG. 5, including: at least one processor 501 and a memory 503 communicatively connected to the at least one processor 501. The memory 503 stores instructions executable by the at least one processor 501. The instructions are executed by the at least one processor 501. The processor 501, when executing the instructions, implements the graphics processing method in the above embodiments. The number of the memory/memories 503 and processor(s) 501 may be one or more. The electronic device is intended to represent various types of digital computers, such as a laptop computer, a desktop computer, a workstation, a personal digital assistant, a server, a blade server, a mainframe computer, and other suitable computers. The electronic device may also represent various types of mobile devices, such as a personal digital assistant, a cellular phone, a smart phone, a wearable device, and other similar computing devices. The components shown herein, their connections and relationships, and their functions are intended as examples only and are not intended to limit the implementation of the present disclosure described and/or claimed herein.

The electronic device may also include a communication interface 505 for communicating with external devices for interactive data transmission. The various devices are connected to each other using different buses and may be mounted on a common motherboard or otherwise mounted as required. The processor 501 may process instructions executed within the electronic device, including instructions stored in or on the memory to display graphical information for a graphical user interface (GUI) on an external input/output device, such as a display device coupled to an interface. In other embodiments, if desired, multiple processors and/or multiple buses may be used with multiple memories. Likewise, multiple electronic devices may be connected, each providing part of the necessary operations (e.g., as a server array, a blade server, or a multiprocessor system). The buses may involve an address bus, a data bus, a control bus, etc. For ease of presentation, only one thick line is used for representation in FIG. 5. However, it is not implied that there is only one bus or one type of bus.

Alternatively, in specific embodiments, if the memory 503, the processor 501, and the communication interface 505 are integrated on one single chip, the memory 503, the processor 501, and the communication interface 505 may communicate with each other through internal interfaces.

It should be understood that the processor may be a central processing unit (CPU), or other general-purpose processors, a digital signal processor (DSP), an application-specific integrated circuit (ASIC), a field-programmable gate array (FPGA), or other programmable logic devices, discrete gates or transistor logic devices, discrete hardware components, etc. The general-purpose processor may be a microprocessor or any conventional processor. It is worth noting that the processor may be a processor that supports the Advanced RISC Machines (ARM) architecture.

An embodiment of the present disclosure provides a computer-readable storage medium (such as the memory 503 described above) storing computer instructions which, when executed by a processor, causes the processor to implement the method according to any of the embodiments of the present disclosure.

Alternatively, the memory 503 may include a storage program area and a storage data area, where the storage program area may store an operating system and application program(s) required by at least one function, and the storage data area may store data created according to the use of the electronic device for the graphics processing method, etc. In addition, the memory 503 may include a high-speed random-access memory and a non-transitory memory, for example, at least one magnetic disk storage device, a flash memory device, or another non-transitory solid-state storage device. In some embodiments, the memory 503 optionally includes memories remotely located with respect to the processor 501, and these remote memories may be connected to the electronic device for the graphics processing method via a network. Examples of the above-mentioned network include the Internet, an intranet, a local area network, a mobile communication network, and a combination thereof.

In description of the present disclosure, references to "one embodiment," "some embodiments," "an example," "a specific example," "some examples," etc., indicate that a particular feature, structure, material, or characteristic described in the embodiment or example can be included in at least one embodiment or example of the disclosure. Moreover, the particular feature, structure, material, or characteristic described can be combined in any one or more embodiments or examples in a reasonable way. Besides, it would be within the knowledge of a person skilled in the pertinent art to affect such feature, structure, material, or characteristic in connection with other embodiments or examples without contradiction.

Moreover, terms such as "first" and "second" are just for illustration which should not be interpreted as indicating or implying relative importance, or implying number of the indicated feature. Thus, a feature described by "first" or "second" can include at least one of the feature explicitly or implicitly. In description of the present disclosure, "multiple" means two or more, unless otherwise specified.

Any process or method described in a flowchart or otherwise herein can be interpreted as including one or more (two or more than two) modules, fragments or sections of executable code to implement steps of a specified logical function or process. Also, the scope of preferred embodiments of the disclosure includes alternative embodiments where the function can be performed out of the order shown or discussed, including performing the function in a substantially simultaneous way or in a reverse order.

The logic and/or steps described in a flowchart or otherwise herein, for example, can be a list of executable code to implement a logic function, which can be embodied in any computer-readable medium and can be used by or in combination with an instruction execution system, apparatus or device (e.g., a computer-based system, a system including a processor, or other systems capable of reading and executing instructions from an instruction execution system, apparatus or device).

It should be understood that various parts of the present disclosure can be implemented by hardware, software, firmware, or a combination thereof. In the foregoing embodiments, various steps or methods can be implemented by software or firmware stored in a memory and executed by a suitable instruction execution system. All or part of the steps of the methods in the foregoing embodiments can be implemented by controlling relevant hardware through a program, which can be stored in a computer-readable storage medium and can implement one or a combination of the steps of the method of the embodiment when executed.

In addition, all the function unit in each embodiment of the disclosure can either be integrated in one processing module, or be separate units, or two or more of the function units are integrated in one module. The integrated module can be implemented by hardware or by function modules of software. Being implemented in the form of software function modules and being sold or used as a separate product, the integrated module mentioned above can also be stored in a computer-readable storage medium, which could be a read-only memory, a magnetic disk, an optical disk, and the like.

Only particular embodiments of the present disclosure are described above, and the scope of protection of the present disclosure is not limited thereto. Various changes or substitutions that can be readily conceived by those skilled in the art within the technical scope disclosed by the present disclosure shall fall within the scope of protection of the present disclosure. Therefore, the scope of protection of the present disclosure should be subject to the scope of protection of the claims.

The invention claimed is:

1. A graphics processing system, comprising:
a geometry processing system, configured to perform geometry processing on primitives to tile visible primitives into a plurality of expanded tiles M' in screen view space; and
a fragment processing system, configured to render each expanded tile M' to obtain a rendered image of the expanded tile M', wherein:
the plurality of expanded tiles M' are obtained by dividing the screen view space into a plurality of tiles M and expanding boundaries of the plurality of tiles M respectively; and
the fragment processing system comprises a post-processing module configured to enable a filter kernel to perform pixel filtering processing on a rendered image of the tile M in each expanded tile M' according to the rendered image of the expanded tile M', and obtain a filtered image of the tile M in each expanded tile M'.

2. The graphics processing system of claim 1, wherein each tile M is a rectangular tile of N×N pixels, while each expanded tile M' is a rectangular tile of (N+2k)×(N+2k) pixels, which is obtained by expanding each boundary of the respective tile M outward by k pixel(s); and the filter kernel is a (2k+1)×(2k+1) filter kernel.

3. The graphics processing system of claim 2, wherein the geometry processing system comprises a geometry processing pipeline and a tiling module, the geometry processing pipeline being configured to delete primitives invisible in the screen view space with only primitives visible in the screen view space retained, and the tiling module being configured to tile the visible primitives into the plurality of expanded tiles M' in the screen view space and generate a tiling display list for each expanded tile M'; and the fragment processing system is configured to render each expanded tile M' according to the respective tiling display list generated by the tiling module, to obtain the rendered images of the plurality of expanded tiles M'.

4. The graphics processing system of claim 3, wherein the tiling module tiles the visible primitives into the plurality of expanded tiles M' in the screen view space by checking whether the primitives overlap each expanded tile M'.

5. The graphics processing system of claim 4, wherein for each expanded tile M', the tiling module is configured to tile all primitives overlapping the expanded tile M' into the expanded tile M' and incorporate the primitives into the tiling display list of the expanded tile M'; and for each primitive, the tiling module is configured to tile the primitive into all expanded tile(s) M' overlapping the primitive and incorporate the primitive into the tiling display list(s) of the expanded tile(s) M'.

6. The graphics processing system of claim 3, wherein the geometry processing system further comprises an input assembler module configured to construct primitives according to input geometry data, and the geometry processing pipeline is configured to process the primitives constructed by the input assembler module to delete the primitives invisible in the screen view space.

7. The graphics processing system of claim 3, wherein the geometry processing pipeline further comprises a geometry transformation module, a clipping and culling module and a data receiving module, wherein the geometry transformation module is configured to transform vertex data of the primitives into the screen view space; the clipping and culling module is configured to delete the primitives invisible in the screen view space, with only the primitives visible in the screen view space retained; and the data receiving module is configured to receive and store both primitive data and the transformed vertex data of the primitives visible in the screen view space.

8. The graphics processing system of claim 7, wherein the fragment processing system comprises a tile processing module, a rasterization module, a hidden surface removal module, and a pixel shading module, wherein the tile processing module is configured to acquire the tiling display list generated by the tiling module, and send primitives, in the tiling display list, required for tile rendering to the rasterization module; the rasterization module is configured to acquire primitive data and the transformed vertex data of the primitives referenced in the tiling display list, and rasterize the primitives into visible pixels; the hidden surface removal module is configured to perform a depth test on the visible pixels output by the rasterization module, and remove pixels located behind other primitives at the same pixel positions; and the pixel shading module is configured to shade visible pixels output by the hidden surface removal module.

9. The graphics processing system of claim 2, wherein a filtered color at pixel (x, y) in the tile M after filtering by the (2k+1)×(2k+1) filter kernel is $$G(x, y) = \sum_{u=-k}^{k} \sum_{v=-k}^{k} h(u, v) f(x+u, y+v),$$

wherein f(x+u, y+v) denotes an original pixel color at pixel (x+u, y+v) in the (2k+1)×(2k+1) filter kernel, and h(u, v) denotes a weight factor of F(x+u, y+v).

10. A graphics processing method, comprising:
performing geometry processing on primitives to tile visible primitives into a plurality of expanded tiles M' in screen view space;

rendering each expanded tile M' to obtain a rendered image of the expanded tile M', wherein the plurality of expanded tiles M' are obtained by dividing the screen view space into a plurality of tiles M and expanding boundaries of the plurality of tiles M respectively; and enabling a filter kernel to perform pixel filtering processing on a rendered image of the tile M in each expanded tile M' according to the rendered image of the expanded tile M', and obtaining a filtered image of the tile M in each expanded tile M'.

11. The graphics processing method of claim 10, wherein each tile M is a rectangular tile of N×N pixels, while each expanded tile M' is a rectangular tile of (N+2k)×(N+2k) pixels, which is obtained by expanding each boundary of the respective tile M outward by k pixel(s); and the filter kernel is a (2k+1)×(2k+1) filter kernel.

12. The graphics processing method of claim 11, wherein the performing geometry processing on primitives comprises: deleting primitives invisible in the screen view space, with only primitives visible in the screen view space retained; tiling the visible primitives into the plurality of expanded tiles M' in the screen view space and generating a tiling display list for each expanded tile M'; and rendering each expanded tile M' according to the tiling display list.

13. The graphics processing method of claim 12, further comprising: tiling the visible primitives into the plurality of expanded tiles M' in the screen view space by checking whether the primitives overlap each expanded tile M'.

14. The graphics processing method of claim 13, wherein for each expanded tile M', all primitives overlapping the expanded tile M' are tiled into the expanded tile M' and incorporated into the tiling display list of the expanded tile M'; and for each primitive, the primitive is tiled into all expanded tile(s) M' overlapping the primitive and incorporated into the tiling display list(s) of the expanded tile(s) M'.

15. The graphics processing method of claim 12, further comprising: constructing primitives according to input geometry data; and the performing geometry processing on primitives further comprises: transforming vertex data of the primitives into the screen view space.

16. The graphics processing method of claim 15, wherein the rendering each expanded tile M' according to the tiling display list comprises: acquiring primitive data and the transformed vertex data of the primitives referenced in the tiling display list, and rasterizing the primitives into visible pixels; performing a depth test on the visible pixels, and removing pixels located behind other primitives at the same pixel positions; and shading remaining visible pixels after the pixel removal.

17. The graphics processing method of claim 11, wherein a filtered color at pixel (x, y) in the tile M after filtering by the (2k+1)×(2k+1) filter kernel is $$G(x, y) = \sum_{u=-k}^{k} \sum_{v=-k}^{k} h(u, v) f(x+u, y+v),$$

wherein f(x+u, y+v) denotes an original pixel color at pixel (x+u, y+v) in the (2k+1)×(2k+1) filter kernel, and h(u, v) denotes a weight factor of F(x+u, y+v).

18. The graphics processing method of claim 10, wherein all pixels needed for filtering processing on the rendered image of each tile M are contained in the expanded tile M' in which the tile M is located.

* * * * *